(12) United States Patent
Markyvech et al.

(10) Patent No.: US 8,226,284 B2
(45) Date of Patent: Jul. 24, 2012

(54) ELECTRIC CHARGE RECEPTACLE WITH ILLUMINATION FEATURE

(75) Inventors: Craig R. Markyvech, Romulus, MI (US); Owen E. Resh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 474 days.

(21) Appl. No.: 12/475,040

(22) Filed: May 29, 2009

(65) Prior Publication Data

US 2010/0302781 A1 Dec. 2, 2010

(51) Int. Cl.
*B60Q 1/26* (2006.01)

(52) U.S. Cl. ........ 362/540; 362/253; 362/459; 320/109; 439/490

(58) Field of Classification Search .................. 362/234, 362/253, 95, 459, 487, 540, 545; 439/34–36, 439/490; 280/422; 320/109
See application file for complete search history.

(56) References Cited

U.S. PATENT DOCUMENTS

| | | | |
|---|---|---|---|
| 5,751,135 A | 5/1998 | Fukushima et al. | |
| 7,438,589 B1 * | 10/2008 | Fleury et al. | 439/490 |
| 7,794,280 B1 * | 9/2010 | Markyvech | 439/34 |
| 2010/0026238 A1 * | 2/2010 | Suzuki et al. | 320/109 |

FOREIGN PATENT DOCUMENTS

| | | |
|---|---|---|
| DE | 19525843 C1 | 7/1996 |
| DE | 19649707 C2 | 2/1999 |
| DE | 20204423 U1 | 7/2002 |
| DE | 102007057243 A1 | 11/2008 |
| JP | 6290836 A | 10/1994 |
| JP | 6325834 A | 11/1994 |
| NL | 1032887 C2 | 10/2008 |

OTHER PUBLICATIONS

German Office Action, dated Aug. 18, 2011, for German Patent Application No. 10 2010 021 587.2.

* cited by examiner

*Primary Examiner* — Stephen F Husar

(74) *Attorney, Agent, or Firm* — Ingrassia Fisher & Lorenz P.C.

(57) ABSTRACT

An electric charge receptacle for a vehicle configured to be used with an electric plug includes a housing, a plurality of prongs, and a light source. The plurality of prongs are disposed within the housing, and are configured to mate with the electric plug. The light source is disposed within the housing.

16 Claims, 4 Drawing Sheets

ELECTRIC CHARGE RECEPTACLE WITH ILLUMINATION FEATURE

TECHNICAL FIELD

The present invention generally relates to the field of vehicles and, more specifically, to electric charge receptacles for vehicles, such as electric vehicles and electric hybrid vehicles.

BACKGROUND OF THE INVENTION

Electric vehicles and electric hybrid vehicles include electric charge receptacles for connecting electric plugs to the vehicle. The electric plugs are also typically connected to a charge current interrupt device having a wall plug that plugs into an electrical outlet that provides electric power for the vehicle. The electric power is utilized for charging a battery of the vehicle. The electric charge receptacles do not typically have illumination features.

Accordingly, it is desirable to provide an electric receptacle with an illumination feature for a vehicle, such as an electric vehicle or a hybrid electric vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, an electric charge receptacle for a vehicle configured to be used with an electric plug is provided. The electric charge receptacle comprises a housing, a plurality of prongs, and a light source. The plurality of prongs are disposed within the housing, and are configured to mate with the electric plug. The light source is disposed within the housing.

In accordance with another exemplary embodiment of the present invention, an electric charge receptacle for a vehicle configured to be used with an electric plug is provided. The electric charge receptacle comprises an inner housing, an outer housing, a plurality of prongs, a light source, and a connector. The outer housing at least partially surrounds the inner housing. The plurality of prongs are disposed within the inner housing, and are configured to mate with the electric plug. The light source is disposed within the inner housing. The connector is configured to connect the light source to a power source.

In accordance with a further exemplary embodiment of the present invention, an electric charge receptacle for a vehicle configured to be used with an electric plug is provided. The electric charge receptacle comprises an inner housing, an outer housing, a plurality of prongs, a light source, and a connector. The outer housing at least partially surrounds the inner housing. The plurality of prongs are disposed within the inner housing, and are configured to mate with the electric plug. The light source is disposed within the outer housing. The connector is configured to connect the light source to a power source.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
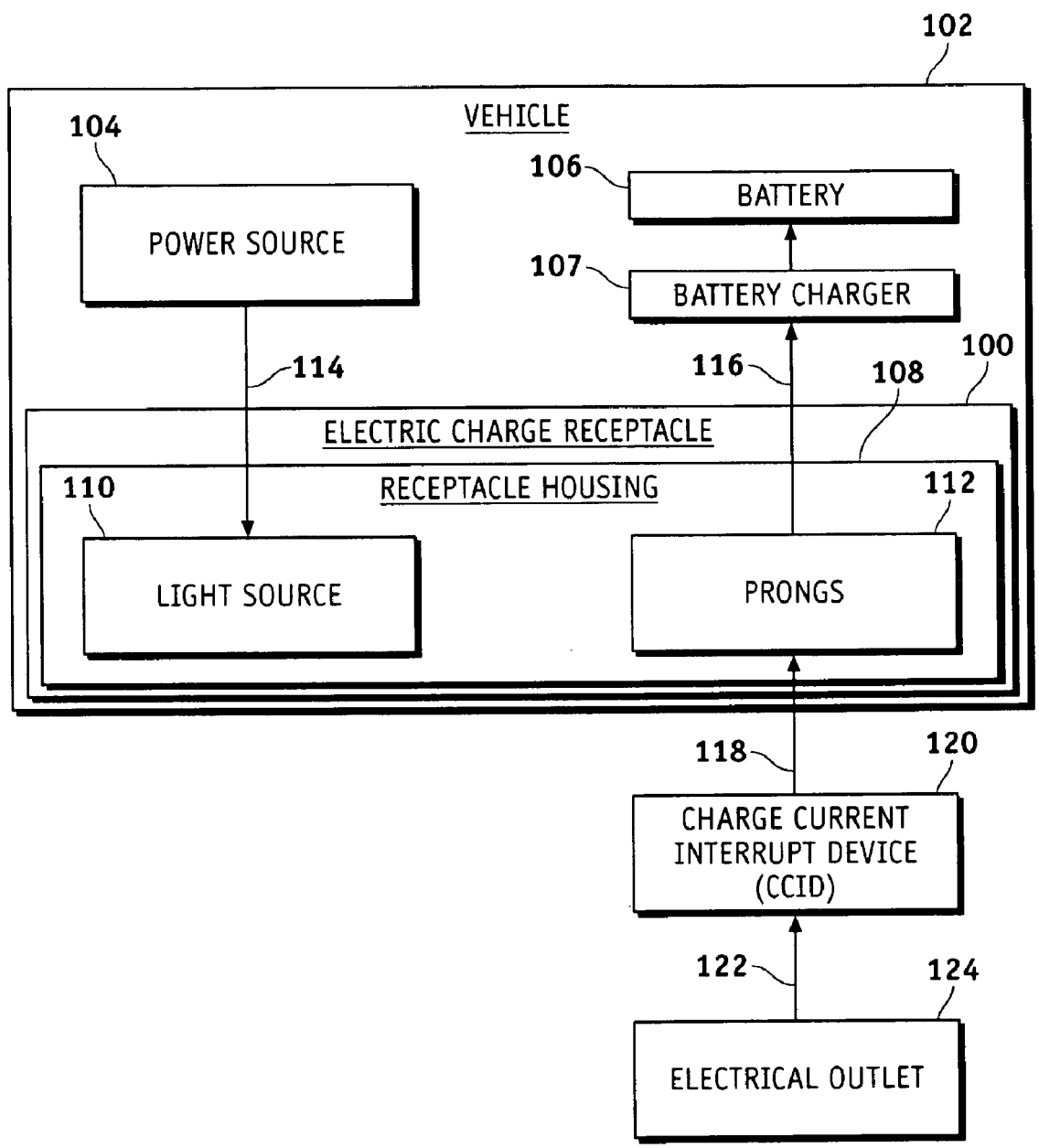
FIG. 1 is a functional block diagram of an electric charge receptacle with an illumination feature for a vehicle, such as an electric vehicle or a hybrid electric vehicle, in accordance with an exemplary embodiment of the present invention.

FIG. 1 is a functional block diagram of an electric charge receptacle 100 for a vehicle 102 having a power source 104, a battery 106, and a battery charger 107. The electric charge receptacle provides for transport of electric power from an electric grid to the battery charger 107 for charging the battery 106 of the vehicle 102. As set forth below, the electric charge receptacle 100 has one or more illumination features. In addition, in a preferred embodiment, the electric charge receptacle 100 conforms to the requirements and specifications of the Society of Automotive Engineers (SAE) that are well known in the field.

In one preferred embodiment, the vehicle comprises an electric vehicle. In another preferred embodiment, the vehicle comprises a hybrid electric vehicle. In addition, in certain preferred embodiments, the vehicle comprises an automobile such as a sedan, a truck, a van, a sport utility vehicle, or another type of automobile. In various embodiments, the electric charge receptacle can be used in connection with any number of types of vehicles and/or systems thereof.

As depicted in FIG. 1, the electric charge receptacle 100 includes a receptacle housing 108, an embedded internal light source 110, and a plurality of prongs 112. The receptacle housing 108 is preferably made from one or more translucent materials. In one preferred embodiment, the receptacle housing 108 is made from one or more opaque plastic materials. Also in one preferred embodiment, the receptacle housing 108 is made from one or more translucent blue materials. In one preferred embodiment, the receptacle housing 108 is made from one or more acrylic or polycarbonate plastic materials with other material suspended in the plastic material for reflecting light from the light source 110. However, the choice of materials for the receptacle housing 108 may vary in other embodiments.

The light source 110 is configured to be coupled to a power source 104 via one or more power source connectors 114. The light source 110 is disposed within the receptacle housing 108. The light source 110 may be disposed in any one or more of a number of different locations within the receptacle housing 108, for example the locations depicted in FIGS. 2-4 and described further below in connection therewith, among other possible locations for placement of the light source 110. In one preferred embodiment, the light source 110 comprises a light-emitting diode (LED) light. However, this may vary in other embodiments. In addition, in various embodiments, more than one light source 110 may also be utilized at one or more locations within the receptacle housing 108.

In a preferred embodiment, the power source 104 is disposed outside of the electric charge receptacle 100 but within the vehicle 102. In one preferred embodiment, the power source 104 comprises a twelve volt battery power system disposed within the vehicle 102. Two or more power sources 104 may be used in various embodiments of the present invention. In addition, the types of power sources 104 may vary in different embodiments.

Any suitable power source connectors 114 may be used for connecting the light source 110 to the particular power source 104. In one preferred embodiment, the one or more power source connectors 114 are included as part of the electric charge receptacle 100. In another preferred embodiment, the one or more power source connectors 114 are provided separate from the electric charge receptacle 100.

The plurality of prongs 112 are disposed within the receptacle housing 108. The plurality of prongs 112 deliver electric current, originating from an electric grid, to the battery charger 107. The plurality of prongs 112 are connected to an electric plug 118 that connects the electric charge receptacle 100 to a charge current interrupt device (CCID) 120. In a preferred embodiment, the electric plug 118 includes a plurality of non-depicted female connectors that mate with the plurality of prongs 112. In addition, as depicted in FIG. 1, the CCID 120 preferably connects to an electrical outlet 124 of the electric grid via a wall plug 122.

Figure 2:
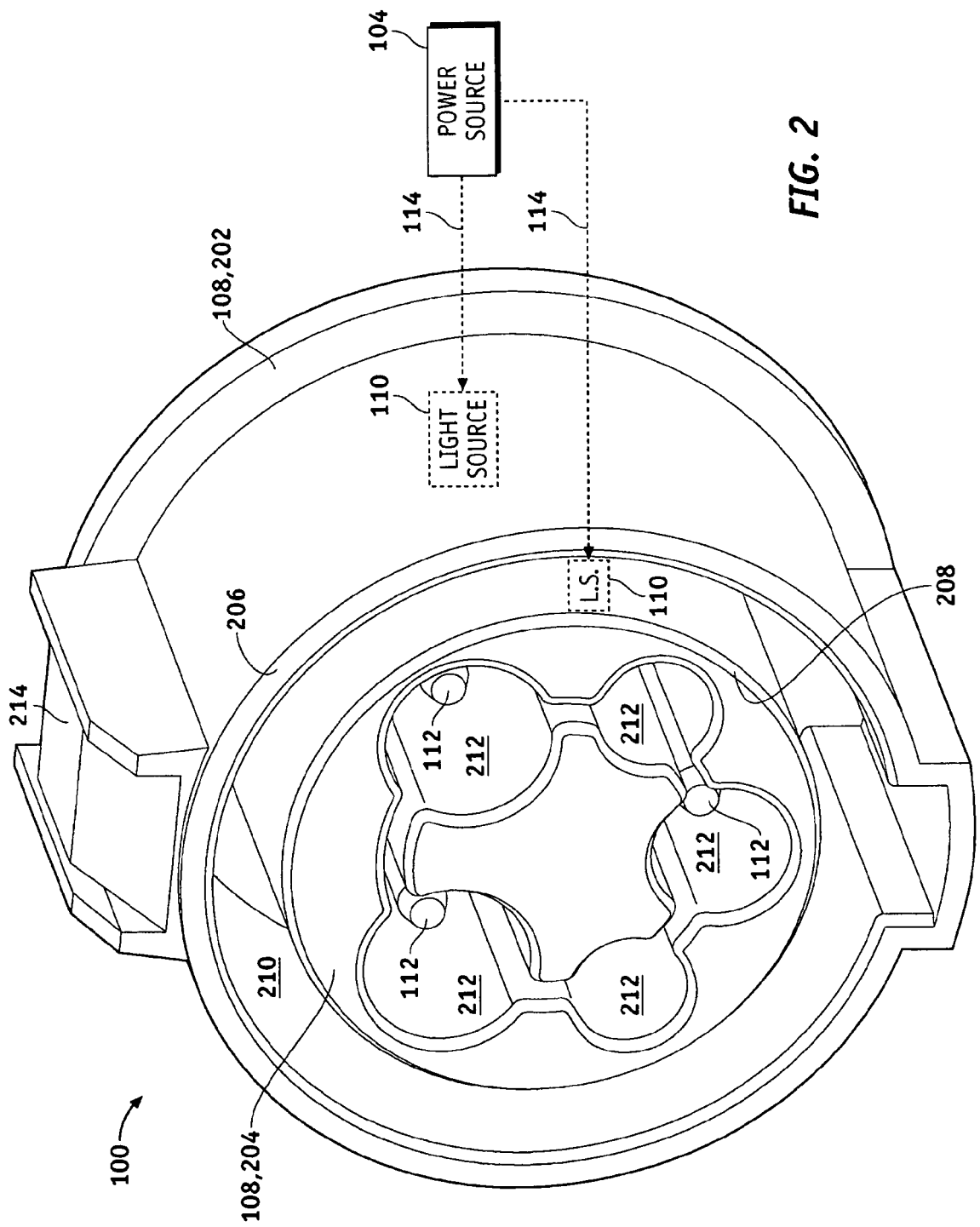
FIG. 2 is a plan view of an exemplary implementation of the electric charge receptacle of FIG. 1 having light sources in an inner wall and an outer wall of a housing of FIG. 1, in accordance with an exemplary embodiment of the present invention.
Figure 3:
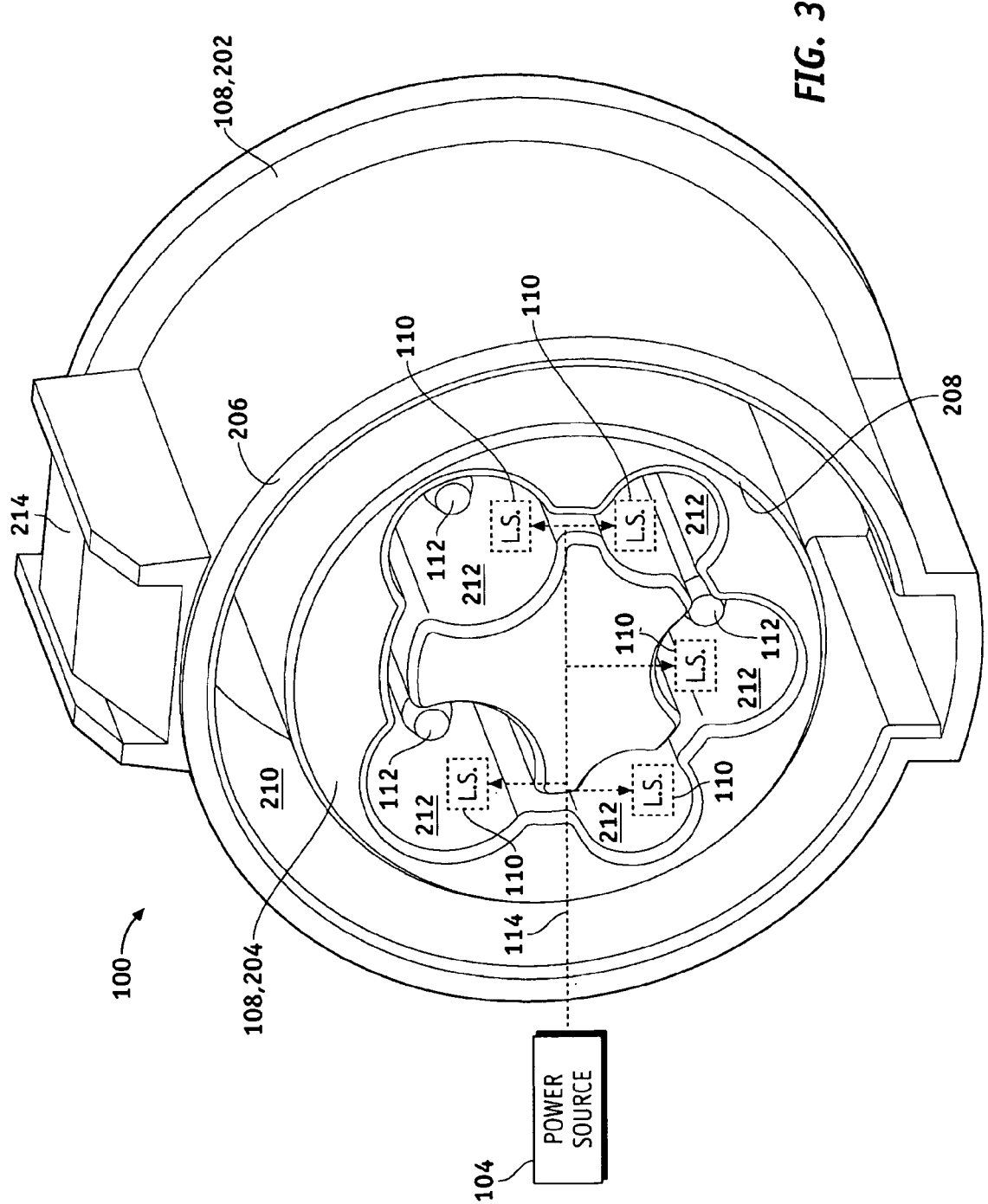
FIG. 3 is a plan view of another exemplary implementation of the electric charge receptacle of FIG. 1 having light sources in a plurality of inner cavities of a housing of FIG. 1, in accordance with another exemplary embodiment of the present invention.
Figure 4:
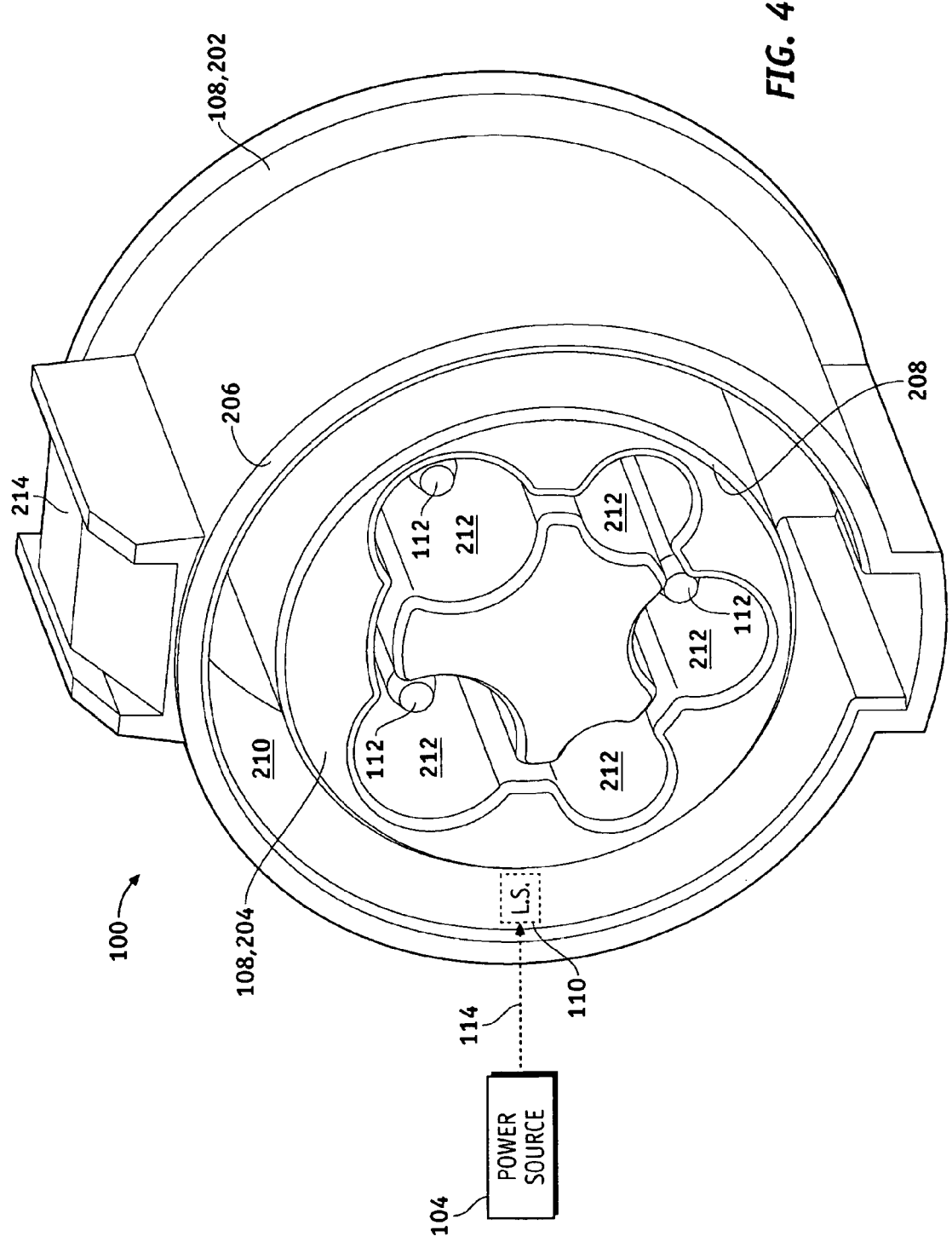
FIG. 4 is a plan view of another exemplary implementation of the electric charge receptacle of FIG. 1 having a light source in an outer cavity of a housing of FIG. 1, in accordance with another exemplary embodiment of the present invention.

FIGS. 2-4 depict plan views of various exemplary implementations of the electric charge receptacle 100 of FIG. 1 in accordance with various exemplary embodiments of the present invention. In each of the embodiments of FIGS. 2-4, the receptacle housing 108 includes an outer housing 202 and an inner housing 204.

The outer housing 202 comprises an outer ring that includes an outer wall 206. In one preferred embodiment, the outer housing 202 and outer wall 206 are made from one or more opaque plastic materials. Also in one preferred embodiment, the outer housing 202 and outer wall 206 are made from one or more translucent blue materials. In one preferred embodiment, the outer housing 202 and outer wall 206 are made from one or more acrylic or polycarbonate plastic materials with other material suspended in the plastic material for reflecting light from the light source 110. However, the choice of materials for the outer housing 202 and outer wall 206 may vary in other embodiments.

The inner housing 204 comprises an inner ring that includes an inner wall 208. In one preferred embodiment, the inner housing 204 and inner wall 208 are also made from one or more opaque plastic materials. Also in one preferred embodiment, the inner housing 204 and inner wall 208 are made from one or more translucent blue materials. In one preferred embodiment, the inner housing 204 and inner wall 208 are made from one or more acrylic or polycarbonate plastic materials with other material suspended in the plastic material for reflecting light from the light source 110. However, the choice of materials for the inner housing 204 and inner wall 208 may also vary in other embodiments.

An outer cavity 210 is formed between the outer wall 206 and the inner wall 208 and surrounded by the outer wall 206. A plurality of inner cavities 212 are each formed by and within the inner wall 208 and surrounded by the inner wall 208. In one preferred embodiment, each of the plurality of inner cavities 212 includes one of the plurality of prongs 112 disposed therein and extending therethrough. Also as depicted in FIGS. 2-4, the electric charge receptacle 100 also preferably includes a latching feature 214 for latching the electric charge receptacle 100 to the vehicle. Any suitable latching feature 214 can be utilized for the electric charge receptacle 100.

FIGS. 2-4 each include different placement locations for the one or more light sources 110 of FIG. 1. In each case, the one or more light sources 110 are connected to the power source 104 of FIG. 1 via the power source connectors 114 of FIG. 1.

First, in the embodiment of FIG. 2, two light sources 110 are utilized, in accordance with one exemplary embodiment of the present invention. Specifically, one light source 110 is disposed within the outer wall 206 of the outer housing 202, and another light source 110 is disposed within the inner wall 208 of the inner housing 204. The light sources 110 are preferably molded within the respective outer and inner walls 206, 208. In this exemplary embodiment, the two light sources 110 preferably illuminate the entire electric charge receptacle 100. In certain variations of this exemplary embodiment, one or more additional light sources 110 may also be implemented within the outer wall 206, the inner wall 208, or elsewhere within the receptacle housing 108, for example, in the outer cavity 210 and/or in one or more of the inner cavities 212.

In another variation of the exemplary embodiment depicted in FIG. 2, one light source 110 is utilized. Specifically, the light source 110 is disposed within the inner wall 208 of the inner housing 204. The light source 110 is preferably molded within the inner wall 208. In this exemplary embodiment, the light source 110 preferably illuminates the inner housing 204. In certain variations of this exemplary embodiment, one or more additional light sources 110 may also be implemented within the inner wall 208 or elsewhere within the receptacle housing 108, for example, within or proximate one or more of the inner cavities 212.

In yet another variation of the exemplary embodiment depicted in FIG. 2, one light source 100 is utilized, but is disposed instead within the outer wall 206 of the outer housing 202. The light source 110 is preferably molded within the outer wall 206. In this exemplary embodiment, the light source 110 preferably illuminates the outer housing 202. In certain variations of this exemplary embodiment, one or more additional light sources 110 may also be implemented within the outer wall 208 or elsewhere within the receptacle housing 108, for example, within or proximate the outer cavity 210.

Turning now to FIG. 3, another implementation of the electric charge receptacle 100 of FIG. 1 is provided in accordance with another exemplary embodiment of the present invention. In the embodiment of FIG. 3, five light sources 110 are utilized. Specifically, each light source 110 is disposed within or proximate one of the plurality of inner cavities 212. In one preferred embodiment, each light source 110 is disposed at least partially within a different one of the inner cavities 212 and illuminates a different one of the plurality of prongs 112 of FIG. 1 within such inner cavity 212. Also in one preferred embodiment, each light source 110 is disposed at least partially against the inner wall 208. However, the number and/or placement of light sources 110 may vary in other embodiments. In addition, in certain variations of this exemplary embodiment, one or more additional light sources 110 may also be implemented, for example, elsewhere within the inner housing 204.

FIG. 4 depicts yet another implementation of the electric charge receptacle 100 of FIG. 1 in accordance with another exemplary embodiment of the present invention. In the embodiment of FIG. 4, one light source 110 is utilized. Specifically, the light source 110 is disposed within or proximate the outer cavity 210. Also in one preferred embodiment, the light source 110 is disposed at least partially against the outer wall 206. However, the number and/or placement of light sources 110 may vary in other embodiments. In certain variations of this exemplary embodiment, one or more additional light sources 110 may also be disposed within or proximate the outer cavity 210 and/or elsewhere within the receptacle housing 108, for example, elsewhere within the outer housing 202.

While FIGS. 2-4 depict exemplary placements of the one or more light sources 110 of FIG. 1 within the receptacle housing 108 of FIG. 1 in accordance with various exemplary embodiments of the present invention, it will be appreciated that the number and/or placement of the one or more light sources 110 may vary in other embodiments of the present invention. It will similarly be appreciated that one or more other components of the electric charge receptacle 100 may vary in other embodiments. It will also be appreciated that the electric charge receptacle 100 can be utilized in any number of vehicles, such as any number of different types of electric vehicles and electric hybrid vehicles.

Accordingly, improved electric charge receptacles are provided for vehicles, such as electric vehicles and hybrid electric vehicles. The improved electric charge receptacles include one or more light sources that are disposed within a receptacle housing of the electric charge receptacle. The one or more light sources are configured to be connected to one or more power sources that are preferably disposed outside of the electric charge receptacle but within the vehicle. Thus, a lighting feature is provided for an electric charge receptacle that illuminates one or more selected portions of the electric charge receptacle and/or that illuminate the entire electric charge receptacle. This provides for enhanced visibility and recognition for the electric charge receptacles and for an improved experience for the users of the improved electric charge receptacles and of the vehicles in which they are implemented.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electric charge receptacle for a vehicle configured to be used with an electric plug, the electric charge receptacle comprising:
    a housing comprising:
        an inner wall; and
        an outer wall disposed about the inner wall;
    a plurality of prongs disposed within the housing, the plurality of prongs configured to mate with the electric plug; and
    a light source disposed within the inner wall.

2. The electric charge receptacle of claim 1, further comprising:
    a connector configured to connect the light source to a power source.

3. The electric charge receptacle of claim 1, further comprising:
    a second light source disposed within the outer wall.

4. The electric charge receptacle of claim 1, wherein the light source is configured to illuminate the inner wall and the outer wall.

5. The electric charge receptacle of claim 1, wherein the housing is made at least in part from a translucent material.

6. The electric charge receptacle of claim 1, wherein the light source comprises a light-emitting diode.

7. An electric charge receptacle vehicle configured to be used with an electric plug, the electric charge receptacle comprising:
    an inner housing;
    an outer housing at least partially surrounding the inner housing;
    a plurality of prongs disposed within the inner housing, the plurality of prongs configured to mate with the electric plug;
    a light source disposed within the inner housing; and
    a connector configured to connect the light source to a power source.

8. The electric charge receptacle of claim 7, wherein:
    the inner housing comprises a wall; and
    the light source is disposed within the wall.

9. The electric charge receptacle of claim 7, wherein:
    the inner housing defines a plurality of cavities; and
    the light source is disposed at least partially within one of the plurality of cavities.

10. The electric charge receptacle of claim 7, wherein the inner housing is made at least in part from a translucent material.

11. The electric charge receptacle of claim 7, wherein the light source comprises a light-emitting diode.

12. An electric charge receptacle for a vehicle configured to be used with an electric plug, the electric charge receptacle comprising:
    an inner housing;
    an outer housing at least partially surrounding the inner housing;
    a plurality of prongs disposed within the inner housing, the plurality of prongs configured to mate with the electric plug;
    a light source disposed within the inner housing; and
    a connector configured to connect the light source to a power source.

13. The electric charge receptacle of claim 12, wherein:
    the inner housing comprises a wall; and
    the light source is disposed within the wall.

14. The electric charge receptacle of claim 12, wherein:
    the outer housing comprises an outer wall;
    the inner housing comprises an inner wall;
    the outer wall and the inner wall define a cavity therebetween; and
    the light source is disposed at least partially within the cavity.

15. The electric charge receptacle of claim 12, wherein the inner housing is made at least in part from a translucent material.

16. The electric charge receptacle of claim 12, wherein the light source comprises a light-emitting diode.

* * * * *